United States Patent [19]
Facey et al.

[11] Patent Number: 6,058,574
[45] Date of Patent: May 9, 2000

[54] DEVICES FOR CLAMPING WIRES, ETC.

[75] Inventors: Hugh David Facey, Sheffield; Brian Edward Shawcross, Retford, both of United Kingdom

[73] Assignee: Gripple Limited, United Kingdom

[21] Appl. No.: 09/142,739

[22] PCT Filed: Feb. 25, 1997

[86] PCT No.: PCT/GB97/00514

§ 371 Date: Sep. 15, 1998

§ 102(e) Date: Sep. 15, 1998

[87] PCT Pub. No.: WO97/36123

PCT Pub. Date: Oct. 2, 1997

[30] Foreign Application Priority Data

Mar. 23, 1996 [GB] United Kingdom ............... 9606155

[51] Int. Cl.[7] ................................................ F16G 11/04
[52] U.S. Cl. .................................... 24/136 R; 24/115 R
[58] Field of Search ........................ 24/135 R, 135 A, 24/135 N, 136 R, 136 A, 115 L, 136 B, 115 M, 456, 569; 403/409.1, 396, 385; 294/102.1; 16/205, 208; 269/249, 261, 251, 283

[56] References Cited

U.S. PATENT DOCUMENTS

| | | |
|---|---|---|
| 1,507,316 | 9/1924 | Kemper et al. ............ 24/136 R X |
| 3,910,546 | 10/1975 | Connors ...................... 24/136 R X |
| 3,965,542 | 6/1976 | Gregory ........................... 24/136 R |
| 4,141,117 | 2/1979 | Van Gompel ................. 24/136 R |
| 4,706,345 | 11/1987 | Rockenfeller et al. ....... 24/135 R X |
| 5,090,924 | 2/1992 | Pfaller et al. ................. 24/136 R |

FOREIGN PATENT DOCUMENTS

| | | |
|---|---|---|
| 1085673 | 2/1955 | France . |
| 3601233 | 7/1986 | Germany . |
| 704091 | 2/1954 | United Kingdom . |
| WO9530844 | 11/1995 | WIPO . |

*Primary Examiner*—James R. Brittain
*Assistant Examiner*—Robert J. Sandy
*Attorney, Agent, or Firm*—Trexler, Bushnell, Giangiorgi & Blackstone, Ltd.

[57] ABSTRACT

A wire clamping device including a body, at least one bore through the body for an end of a wire and at least one channel in the body converging at an acute angle and into communication with the bore towards an inlet end of the bore. An abutment is at an end of the channel remote from the inlet end of the bore, and a wedge is movable along the channel between the abutment and a region of communication with the bore. A face of the wedge facing the abutment is provided with an undercut groove, and a hole is provided through the abutment for passage therethrough of a rod-like tool provided with diametrically opposed projections at one end for pulling engagement with the undercut groove by partial rotation of the tool from an insertion position.

32 Claims, 7 Drawing Sheets

DEVICES FOR CLAMPING WIRES, ETC.

BACKGROUND

This invention relates to devices for clamping wires, ropes or cables, being of the type having a body, at least one bore through the body for an end of a wire (or the like, such as a cable, hereafter referred to simply as wire), at least one channel in the body converging at an acute angle and into communication with the bore towards an inlet end of the bore, an abutment at the end of the channel remote from the inlet end of the bore, and a wedge movable along the channel between the abutment and the region of communication with the bore, (and usually with a coil compression spring between the abutment and the wedge) whereby, upon attempted withdrawal of an inserted wire through the inlet end of the bore, the wedge forces the wire into frictional engagement with the wall of the bore opposite the channel.

Tensioning adjustment of an inserted wire can be effected by pulling the wire end emerging from the other (outlet) end of the bore, causing release of the grip of the wedge until that pull is released and the wedge can again exert a force on the wire.

The device with a single bore, channel, abutment, and wedge (with optional spring) may be a terminal device for a wire, or it may be provided with another bore, channel, abutment, and wedge (with optional spring), with the inlet end of the second bore at the opposite end of the body to the inlet end of the first bore, to form a connector for oppositely directed wire ends, and the two bores are preferably disposed in close side-by-side lengthwise relationship, with the regions of communication between the respective channels and bores closely adjacent each other, and with the wall portion therebetween capable of localised distortion under the forces exerted by the wedges through the inserted wires, to increase the frictional contact of the wires with the respective bores and/or allow the wires to come into contact with each other.

OBJECT AND SUMMARY

The object of the invention is to provide a wire (or the like) clamping device (or connector) as described above with means enabling release of the (or either) wedge to allow the wire end (or the respective wire end) to be withdrawn in the opposite direction to that in which it had been inserted.

According to one aspect of the invention, a wire clamping device of the type having a body, at least one bore through the body for an end of a wire, at least one channel in the body converging at an acute angle and into communication with the bore towards an inlet end of the bore, an abutment at the end of the channel remote from the inlet end of the bore, and a wedge movable along the channel between the abutment and the region of communication with the bore, is characterized in that the face of the wedge facing the abutment is provided with an undercut groove, and a hole is provided through the abutment for passage therethrough of a rod-like tool provided with diametrically opposed projections at one end for pulling engagement with the undercut groove by partial rotation of the tool from an insertion position.

When the rod-like tool has been engaged with the wedge it can be pulled to retract the wedge (against the urge of any spring) and release the grip of the wedge on the wire in the bore, whereafter, while the wedge is held retracted by the tool, the wire end can be withdrawn in the opposite direction to that in which it had been inserted, either partially (for positional adjustment) or totally.

The hole in the abutment preferably has a cross-section conforming closely to the cross-section of the end of the rod-like tool with the projections, and preferably has its largest dimension (corresponding to the overall dimension over the projections) aligned with the lengthwise direction of the undercut groove in the wedge, so that upon insertion of that end of the tool into the hole it is automatically aligned with the insertion position into the undercut groove.

The undercut groove in the wedge may have a dovetail cross-section, and the projections on the rod-like tool have a mating angular profile. Alternatively, the undercut groove may have a T cross-section, the projections on the rod-like tool then having, a rectangular profile for mating with the wider part of the groove.

The invention also includes the combination of a clamping device and a tool as hereinbefore defined, and the tool preferably has a handgrip at its other end, which may be formed by an integral loop of rod material or simply by a bent end.

According to another aspect of the present invention, a wire clamping device of the type having a body, at least one bore through the body for an end of a wire, at least one channel in the body converging at an acute angle and into communication with the bore towards an inlet end of the bore, an abutment at the end of the channel remote from the inlet end of the bore, and a wedge movable along the channel between the abutment and the region of communication with the bore, is characterized in that the face of the wedge facing the abutment is provided with an undercut groove, and a screwthreaded hole is provided through the abutment for rotation therein of a screw provided with a necked tip at one end rotatably engaged with the undercut groove in the wedge, to enable the latter to be pushed and pulled by rotation of the screw in one direction or the other, the other end of the screw being provided with means for effecting said rotation of the screw, e.g., a cross-slot for a screwdriver, or a square or hexagon head for a spanner or wrench, or a recessed head for engagement by a key.

The undercut groove in the wedge may have a dovetail cross-section, and the necked tip of th e screw have a frustoconical form with the smaller diameter end adjoining the rest of the screw. Alternatively, the undercut groove may have a T cross-section, the necked tip of the screw then having a head engaged with the wider part of the groove and a neck connecting the head with the rest of the screw and passing through the narrower part of the groove.

The necked tip of the screw may have some freedom of movement with respect to the groove in the wedge in the axial direction of the screw, to permit tension loading of the inserted wire to draw the wedge into a tighter grip. Alternatively, or in addition, the screwthreaded portion of the screw may lie between the necked tip and a plain shank having a diameter no greater than the base diameter of the screwthread, the length of the screwthreaded portion being limited such that, when the screw has been screwed in far enough for the wedge to have made gripping engagement with an inserted wire, the screwthreaded portion becomes disengaged from the screwthreaded hole in the abutment, whereafter tension loading of the inserted wire can draw the wedge into a tighter grip—because the screw can be drawn inwards along with the wedge. The plain shank is preferably long enough to protrude from the abutment, so that it can be grasped by pliers or a wrench to effect withdrawal of the wedge until the screwthreaded portion can again be engaged with the screwthreaded hole in the abutment.

Again, the abutment may be provided with a plain (i.e. non-screwthreaded) hole, and the screw provided with a nut non-rotatably slidable along the channel, with a coil compression spring between the nut and the abutment; the nut initially being positioned adjacent the necked tip of the screw so that an inserted wire end can push the wedge towards the abutment against the urge of the spring, the screw can then be rotated to draw the nut towards the abutment so as to compress the spring completely, whereafter further rotation of the screw in the same direction urges the wedge into locking engagement with the wire. To release the wedge from the wire, an additional nut may be screwed on to the portion of the screw protruding from the abutment. However, before applying the additional nut the screw may be rotated in the opposite direction to that in which it urged the wedge into locking engagement with the wire so as to move the nut in the channel towards the necked tip of the screw, to allow the coil compression spring to extend, then the screw is held against rotation while the additional nut is applied and rotated on the screw (preferably with a washer interposed between the additional nut and the abutment), so that the screw withdraws the wedge against the urge of the spring. Alternatively, the additional nut may be held stationary and the screw rotated in the opposite direction to that in which it urged the wedge into locking, engagement with the wire; a recess may be provided at the outer face of the abutment for engagement by the additional nut to hold it stationary (thus avoiding the need for a spanner or wrench), and the recess may be formed as an indentation in the abutment or by an annular up stand on the abutment, with the inner periphery of the indentation or upstand matching the outer periphery of the additional nut, or the recess may be formed by a pair of projections flanking opposite flats of the additional nut, which projections may be constituted by swaged-in side portions of the body of the device overlying the outer face of the abutment. Until the additional nut is applied to the protruding portion of the screw release of the wedge is greatly inhibited. The screw may be provided with a pair of flats extending longitudinally from the end remote from the necked tip, for engagement by a tool for effecting rotation of the screw, which tool may be provided with means for applying the additional nut.

According to a further embodiment of the invention, a wire clamping device of the type having a pair of bores disposed in close side-by-side relationship, with respective inlet ends at opposite ends of the body, and with respective channels, abutments and wedges (with optional springs), with the channels converging in opposite directions with the respective bores to regions of communication between the respective channels and bores closely adjacent each other, and with the wall portion therebetween capable of localised distortion under the forces exerted by the wedges through inserted wires, to increase the frictional contact of the wires with the respective bores, is characterized in that at least one wedge has its face facing the respective abutment provided with an undercut groove, the respective abutment is provided with a hole, and a screw, which is rotatable in the hole in the abutment, is provided at one end with a necked tip rotatably engaged with the undercut groove in the wedge to enable the latter to be pushed and pulled by rotation of the screw in one direction or the other, the other end of the screw being provided with means for effecting said rotation of the screw, e.g. a cross-slot for a screwdriver, or a square or hexagon head for a spanner or wrench or a recessed head for engagement by a key. The hole in the abutment may be screwthreaded for engagement by a screwthreaded portion of the screw in either manner as described above in relation to a terminal clamp, or the hole in the abutment may be plain, and the screw provided with a nut non-rotatably slidable along the channel, and with a coil compression spring between the nut and the abutment, also as described above in relation to a terminal clamp.

A clamping device as just described above may be used to secure a terminal loop or "eye" in a wire (or cable), the wire (or cable) end being first inserted through the inlet end of the bore leading to the at least one wedge having an undercut groove until the wire (or cable) end emerges from the other end of the body, the wire (or cable) then being bent into a loop, preferably round a thimble, and the wire (or cable) end inserted through the inlet end of the bore leading to the other wedge until it emerges from the body again. A coil compression spring is preferably provided between that other wedge and its abutment, so as to urge the wedge into gripping contact with the wire (or cable), which grip is increased by pulling on the loop; on the other hand, pulling on the loop tends to release the grip on the wire (or cable) in the first-inserted bore, which is why the screw is provided and must be used to lock the wedge on to the wire (or cable) before any load is applied to the loop.

Preferably, however, both wedges are provided with undercut grooves for engagement by necked tips on screws rotatable in holes in the abutments, so that a wire (or cable) to be formed into a terminal loop or "eye" can be first inserted through either inlet end.

BRIEF DESCRIPTION OF THE DRAWINGS

Embodiments of the invention will now be described, by way of example only, with reference to the accompanying drawings, in which.

DESCRIPTION

Figure 1:
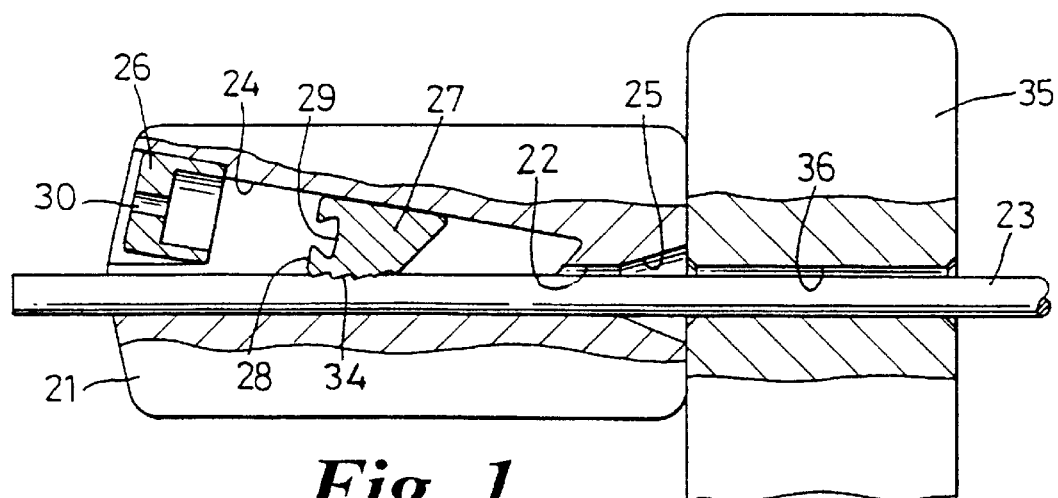
FIG. 1 is a part-sectional elevation of one form of clamping device in accordance with invention forming a terminal for a wire shown passing through a hole near the top of a post.
Figure 2:
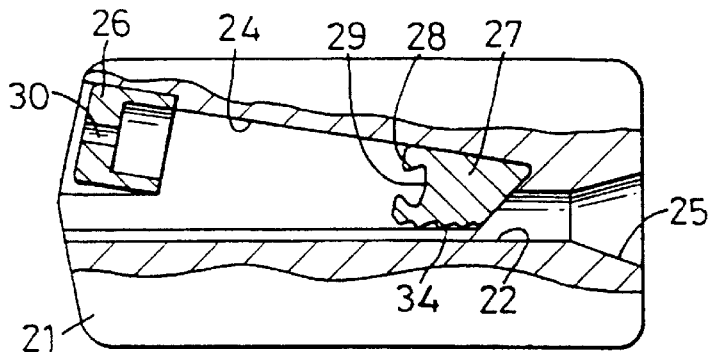
FIG. 2 shows the device of FIG. 1 in its as-assembled condition.

In FIGS. 1 to 4, a clamping device has a body 21, a bore 22 through the body for an end of a wire 23, a channel 24 in the body converging at an acute angle and into communication with the bore towards an inlet end 25 of the bore, an abutment 26 at the end of the channel remote from the inlet end of the bore, and a wedge 27 movable along the channel between the abutment and the region of communication with the bore, the face 28 of the wedge facing the abutment 26 being provided with an undercut groove 29, and a hole 30 being provided through the abutment for passage therethrough of a rod-like tool 31 (see also FIG. 5) provided with diametrically opposed projections 32 at one end for pulling engagement with the undercut groove by partial rotation of the tool from an insertion position.

Figure 3:
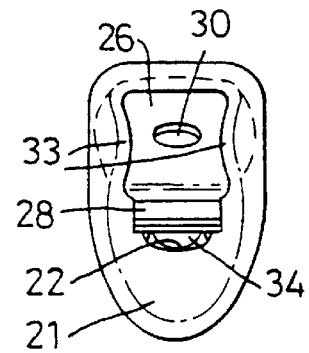
FIG. 3 is a view from the left-hand end of FIG. 2.

The abutment 26 is secured in the body 21 by "staking" or swaging in side portions 33 of the body, as shown in FIG. 3.

The wedge has a ribbed surface 34 to bite into the surface of the wire 23 when the latter is put under load, as shown in FIG. 1, in which the device is shown as a terminal for the wire by abutting a post 35 having a hole 36 through which the wire passes. Thus the wire 23 may be a line wire of a fence or in a vineyard.

Figure 6:
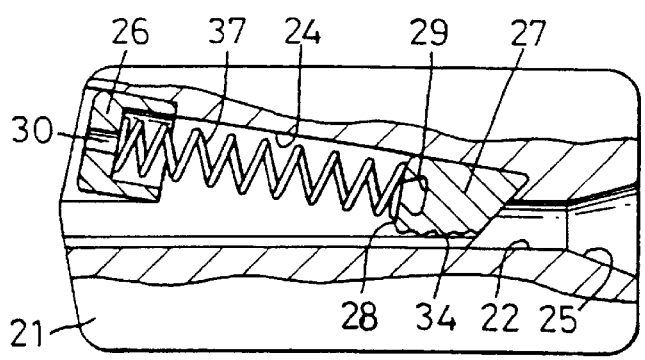
FIG. 6 corresponds to FIG. 2 but shows a preferred additional feature.

If the wire 23 becomes slack it can be pulled to the left in FIG. 1 until the wedge 27 is released, whereafter the wedge can be pushed back into engagement with the wire, as by pushing the wedge by means of the tool 31 or—preferably—by means of a coil compression spring 37, as shown in FIG. 6, between the wedge and the abutment 26.

Figure 4:
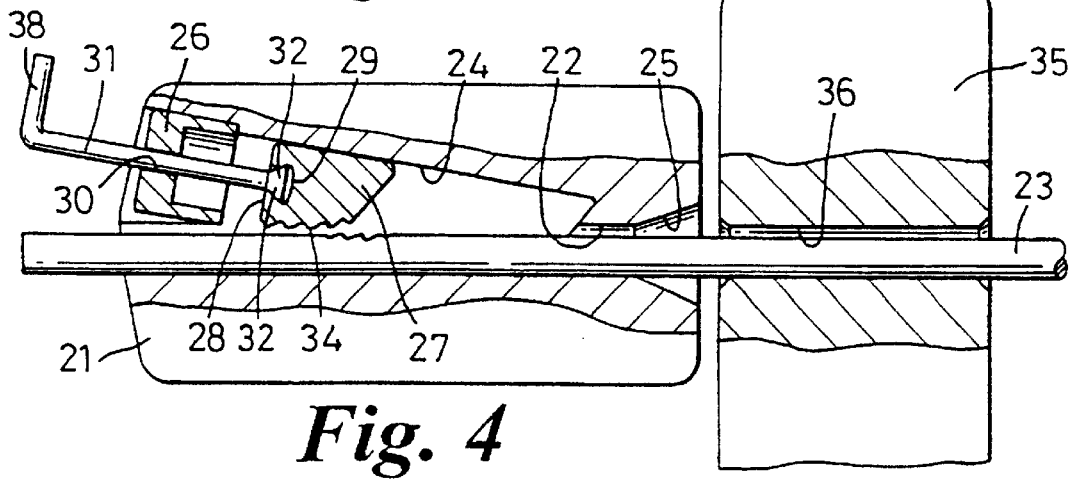
FIG. 4 corresponds to FIG. 1 but shows how release of the wire is effected by means of a special tool.

The end 38 of the tool 31 remote from the projections 32 is shown bent at right-angles to form a handle, useful both for rotating the tool to effect engagement and disengagement of the projections with or from the undercut groove 29 in the wedge 27 and for pulling the wedge out of engagement with the wire, as shown in FIG. 4.

The hole 30 in the abutment 26 has a cross-section conforming closely to the cross-section of the end of the tool 31 with the projections 32, and the hole has its largest dimension (corresponding to the overall dimension over the projections) aligned with the lengthwise direction of the undercut groove 29 in the wedge 27, so that upon insertion of that end of the tool into the hole it is automatically aligned with the insertion position into the undercut groove.

Figure 5:
FIG. 5 is a view of the tool of FIG. 4 seen at right-angles thereto.
Figure 7:
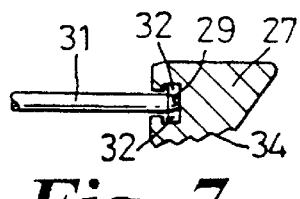
FIG. 7 corresponds to part of FIG. 4, but shows a modified tool and correspondingly modified wedge.
Figure 8:
FIG. 8 is a view of the tool of FIG. 7 seen at right-angles thereto.

The projections 32 of the tool 31 as shown in FIGS. 4 and 5 take the form of a dovetail fitting loosely in a groove 29 in the wedge 27 of corresponding cross-section, while in FIGS. 7 and 8 the undercut groove 29 is a T cross-section and the projections 32 have a corresponding rectangular form.

Figure 9:
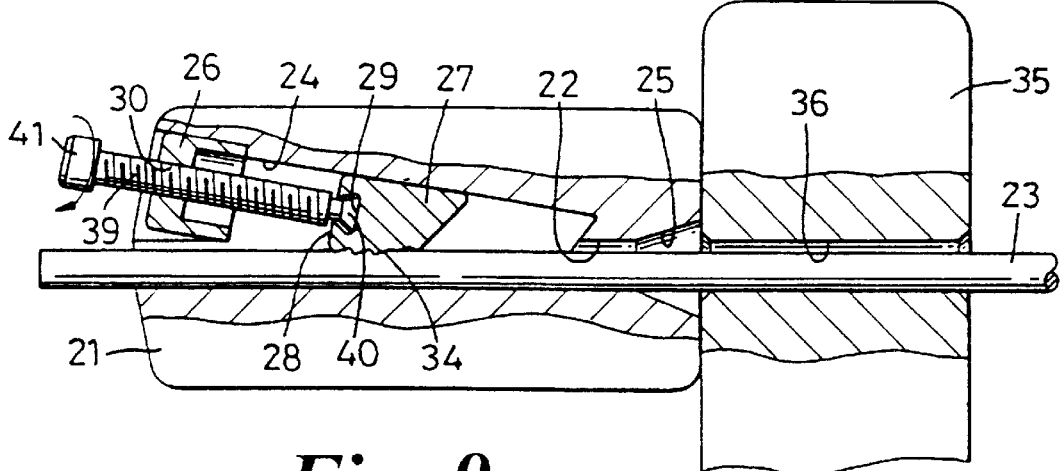
FIG. 9 corresponds to FIG. 1 but includes a locking screw.
Figure 10:
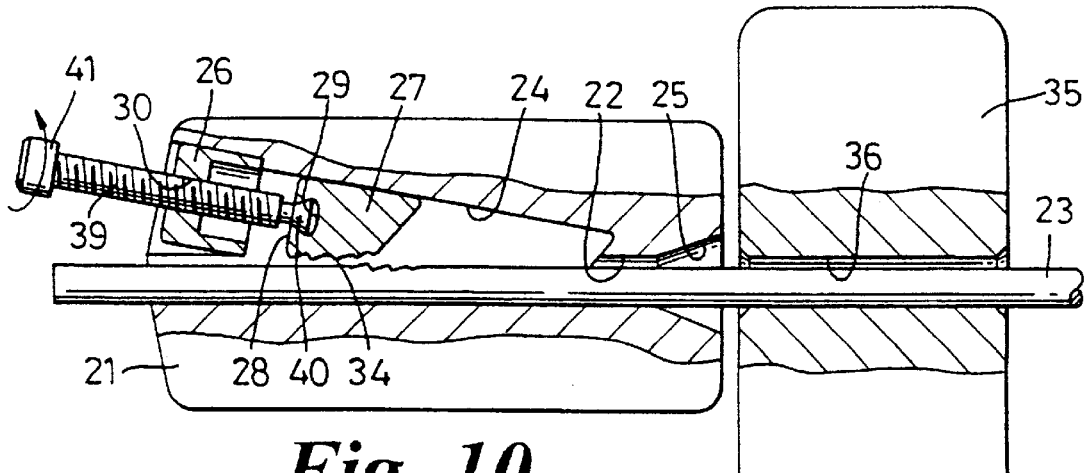
FIG. 10 corresponds to FIG. 9 but shows the screw being used to effect release of the wire.

In the embodiment of FIGS. 9 and 10, the hole 30 in the abutment 26 is screwthreaded for rotation therein of a screw 39 provided with a necked tip 40 at one end rotatably engaged with the undercut groove 29 in the wedge 27, to enable the latter to be pushed and pulled by rotation of the screw in one direction or the other, the other end of the screw being provided, by way of example, with a recessed head 41 for engagement by a key (not shown) for effecting said rotation of the screw.

It will be appreciated that, in order for the wire 23 to be inserted through the bore 22 in the body 21 of the device, the screw 39 must set the wedge 27 in a position similar to its position in FIG. 10, whereafter the screw can be rotated to drive the wedge into locking engagement with the wire as shown in FIG. 9.

With an undercut groove 29 of dovetail cross-section, as shown in FIGS. 9 and 10, the necked tip 40 of the screw 39 has a frustoconical form with the smaller diameter end adjoining the rest of the screw. If, alternatively, the undercut groove has a T cross-section, as in FIGS. 7 and 8, the necked tip would then have a head (not illustrated) engaged with the wider part of the groove and a neck connecting the head with the rest of the screw and passing through the narrower part of the groove.

It will be seen in FIGS. 9 and 10 that the necked tip 40 of the screw has some freedom of movement with respect to the groove 29 in the wedge 27 in the axial direction of the screw, to permit tension loading of the inserted wire 23 to draw the wedge into a tighter grip. However, the wedge 27 can be readily withdrawn out of engagement with the wire by appropriate rotation of the screw, as indicated in FIG. 10.

Figure 11:
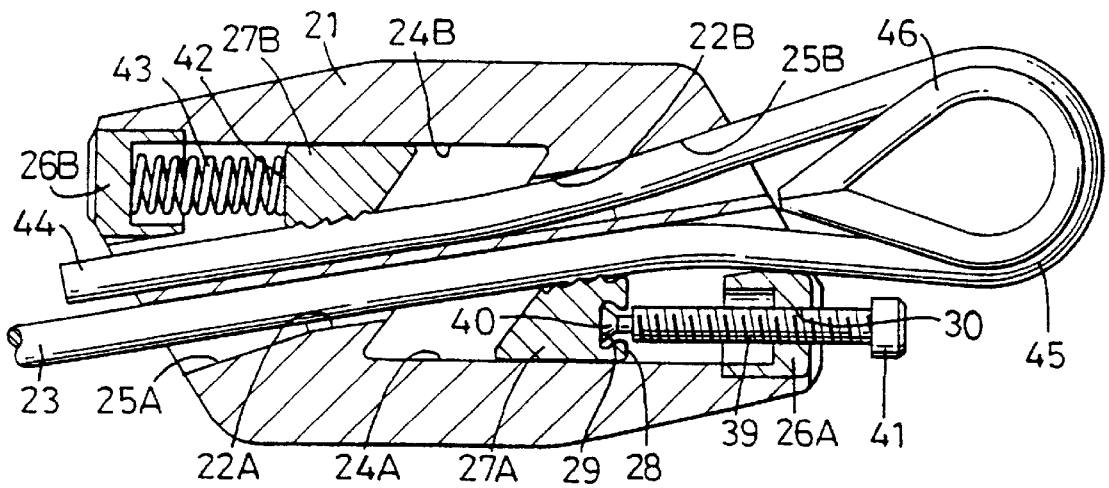
FIG. 11 is a longitudinal section through a clamping device in accordance with the invention used to secure a terminal loop or "eye" in a wire (or cable)
Figure 12:
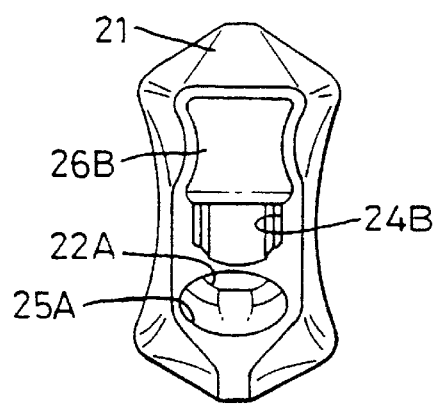
FIG. 12 is a view from the left hand end of FIG. 11 before inserting the wire (or cable)
Figure 13:
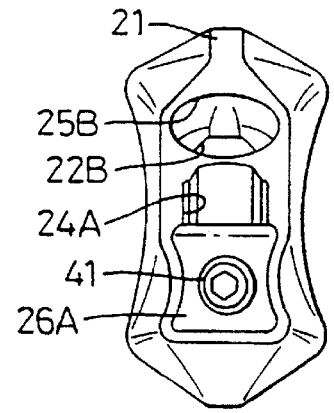
FIG. 13 corresponds to FIG. 12 but is taken from the right-hand end of FIG. 11.
Figure 14:
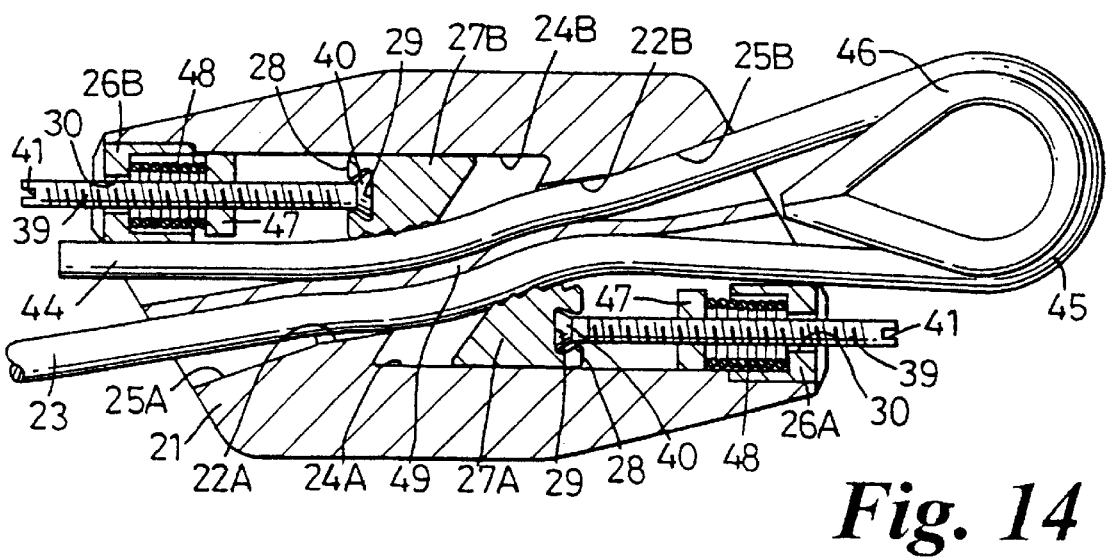
FIG. 14 corresponds to FIG. 11, but shows alternative locking arrangements in the device.

In FIGS. 11 to 13, a wire clamping device of the type having a body 21, a pair of bores 22A, 22B disposed in close side-by-side relationship, with respective inlet ends 25A, 25B at opposite ends of the body, and with respective channels 24A, 24B, abutments 26A, 26B and wedges 27A, 27B, with the channels converging in opposite directions with the respective bores to regions of communication between the respective channels and bores closely adjacent each other, and with the wall portion therebetween capable of localised distortion under the forces exerted by the wedges through inserted wires (as shown in FIG. 14), to increase the frictional contact of the wires with the respective bores, is characterized in that one wedge 27A has its face 28 facing the respective abutment 26A provided with an undercut groove 29, and a screw 39 which is rotatable on a screwthreaded hole 30 provided in the abutment 26A, is provided at one end with a necked tip 40 rotatably engaged with the undercut groove 29, to enable the wedge 27A to be pushed and pulled by rotation of the screw in one direction or the other, the other end of the screw 39 being provided with a recessed head 41 for a key (not shown) for effecting said rotation.

The other wedge 27B is shown in FIG. 11 with a plain face 42 facing towards the respective abutment 26B, which has no hole, a coil compression spring 43 is provided between the wedge 27B, and the abutment 26B, and the clamping device is shown being used to secure a terminal loop or "eye" in a wire (or cable) 23, the wire (or cable) end 44 being first inserted through the inlet end 25A of the bore 22A leading to the wedge 27A (which, it will be appreciated, will have been set withdrawn sufficiently by the screw 39 to allow the wire to pass that wedge) until the end 44 emerges from the other end of the body, the wire (or cable) then being bent into a loop 45 round a thimble 46 and the end 44 inserted through the inlet end 25B of the bore 22B leading to and past the other wedge 27B until it emerges from the body 21 again.

The coil compression spring 43 urges the wedge 27B into gripping contact with the wire (or cable) 23, which grip is increased by pulling on the loop 45; on the other hand, pulling on the loop tends to release the grip of the wedge 27A, which is why the screw 39 is provided and must be used to lock the wedge 27A on to the wire (or cable) 23 before any load is applied to the loop 45.

If the position of the loop or "eye" needs to be adjusted with respect to the length of the ire (or cable) 23, e.g., because of slackness in the latter, the screw 39 is rotated appropriately to withdraw the wedge, the thimble 46 and loop 45 then pulled away from the body 21 of the device, to take up slack, and then the thimble and loop are pulled back to the body by pulling the end 44 of the wire or cable farther through the bore 22B, thus releasing the wedge 27B until load is reapplied to the loop 45.

Preferably, however, as shown in FIG. 14, the wedge 27B is also provided with an undercut groove 29 in its face 28 facing towards the respective abutment 26B, which is provided with a hole 30 for a screw 39 having a necked tip 40 rotatably engaged in the undercut groove, so that the wedge 27B can be positively locked onto the wire (or cable) 23. The other end of each screw being provided with a screwdriver slot 41. FIG. 14 also shows an alternative arrangement for the locking screw or screws 39, the abutments 26A, 26B being provided with plain holes 30 for the screws, which are each provided with a nut 47 slidable along the respective channel 24A or 24B and provided with a coil compression spring 48 between the nut 47 and the respective abutment 26A or 26B.

Figure 15:
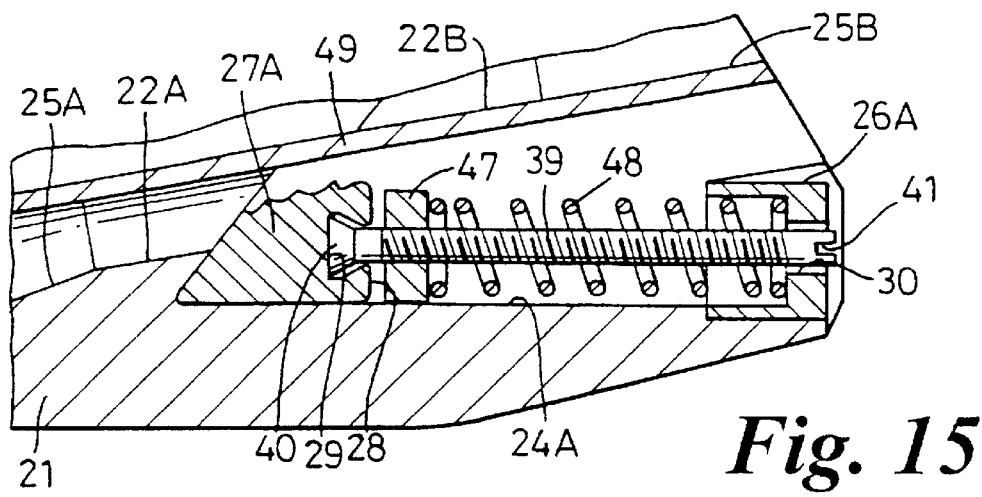
FIG. 15 is an enlargement of a lower part of FIG. 14, but shows the locking screw arrangement in its as-assembled condition.
Figure 16:
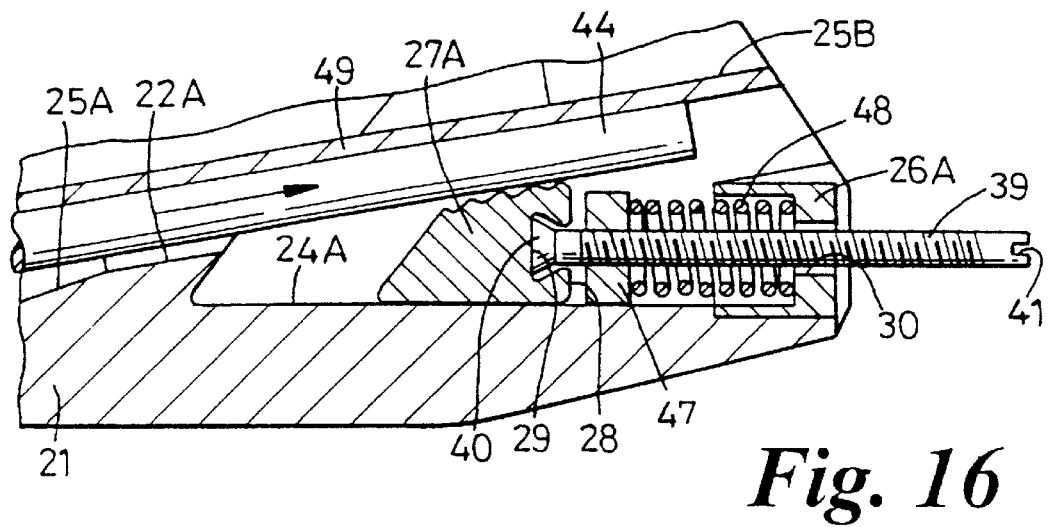
FIG. 16 corresponds to FIG. 15, but shows an inserted wire pushing past the wedge.
Figure 17:
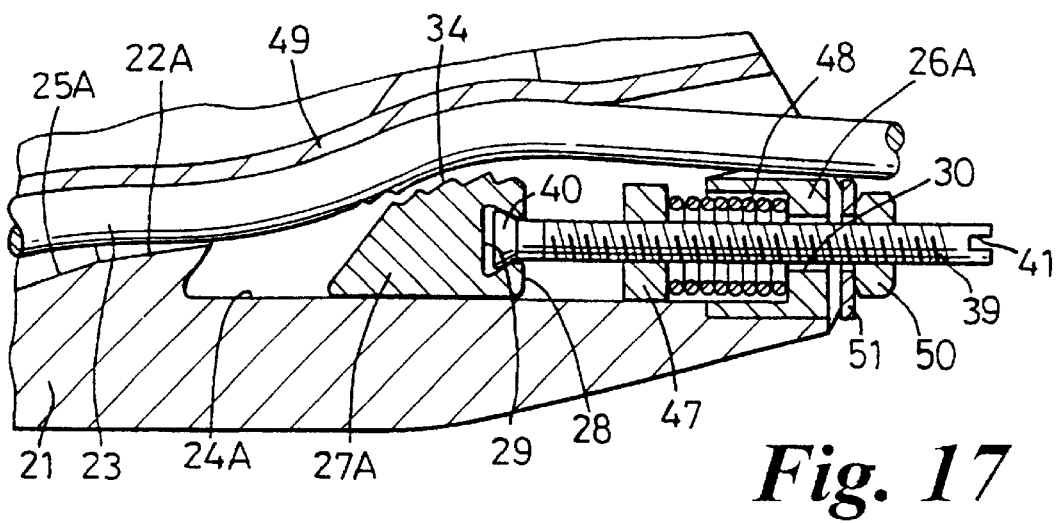
FIG. 17 corresponds to FIG. 15 or FIG. 16, but shows how the wire is released.

FIG. 15 shows one nut 47 initially positioned adjacent the necked tip 40 of the screw 39 so that an inserted wire (or cable) end 44 can push the wedge 27A towards the abutment 26A against the urge of the spring 48, as shown in FIG. 16. The screw can then be rotated to draw the nut towards the abutment so as to compress the spring completely, as shown in FIG. 14 (and also in FIG. 17), whereafter further rotation of the screw 39 in the same direction urges the wedge 27A into locking engagement with the wire (or cable), and in FIG. 14 both springs 48 are shown in this condition and the screws 39 screwed in until the wall portion 49 between the regions of communication between the respective channels and bores (24A and 22A, 24B and 22B) is distorted locally by the forces exerted through the inserted wire (or cable) 23.

To release either wedge 27A, 27B from the wire (or cable), an additional nut 50 (see FIG. 17) is screwed on to the portion of the screw 30 protruding from the respective abutment 26, with a washer 51 interposed between the additional nut and the abutment, and either the nut 50 is held stationary and the screw rotated in the opposite direction to that in which it urged the wedge 27A into locking engagement with the wire, or the screw is rotated before applying the additional nut 50, so as to move the nut 47 in the channel 24A towards the necked tip 40 of the screw to allow the coil compression spring 48 to extend, and then the screw is held against rotation while the additional nut 50 is applied and rotated on the screw.

Figure 18:
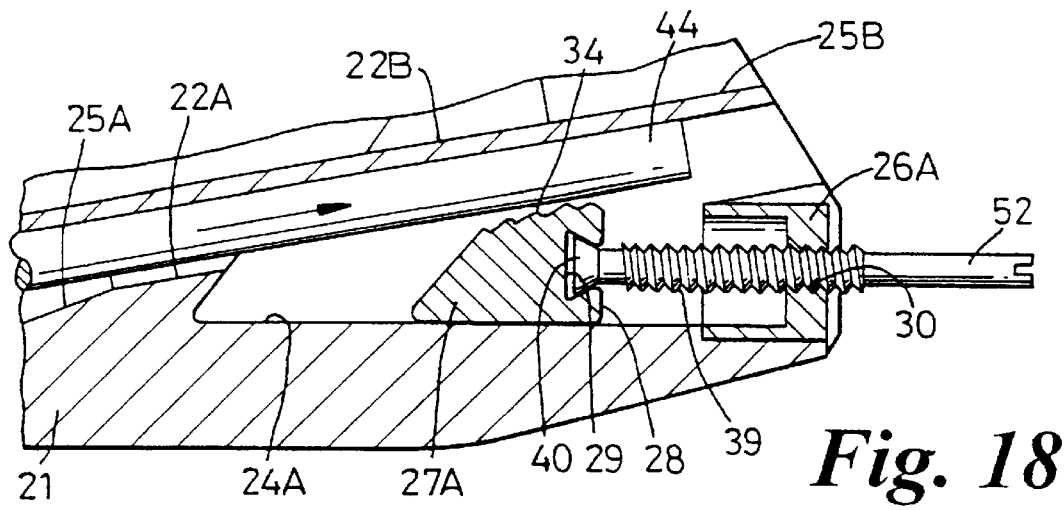
FIG. 18 corresponds to FIG. 16, but shows a further alternative locking screw arrangement.
Figure 19:
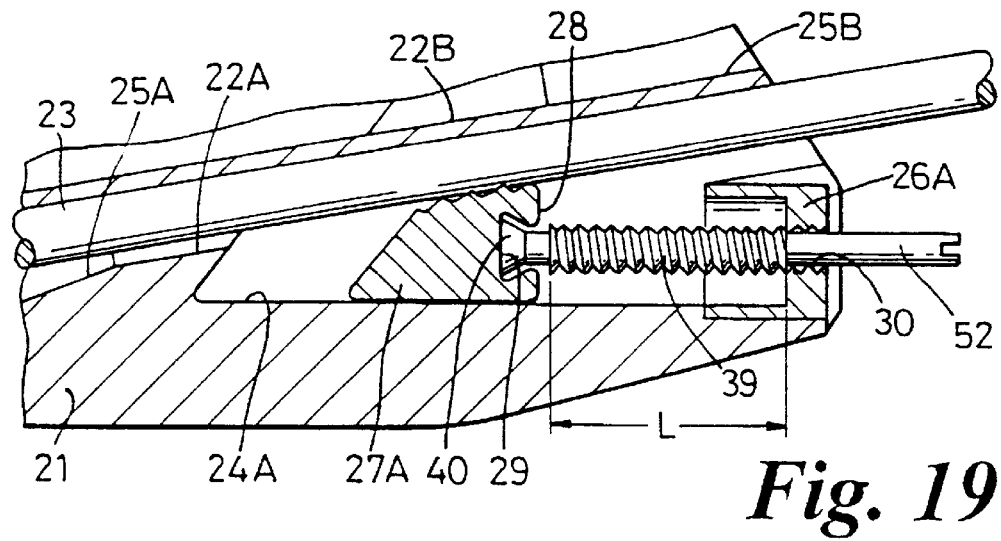
FIG. 19 corresponds to FIG. 18, but shows the wedge and locking screw in an initial locking position.
Figure 20:
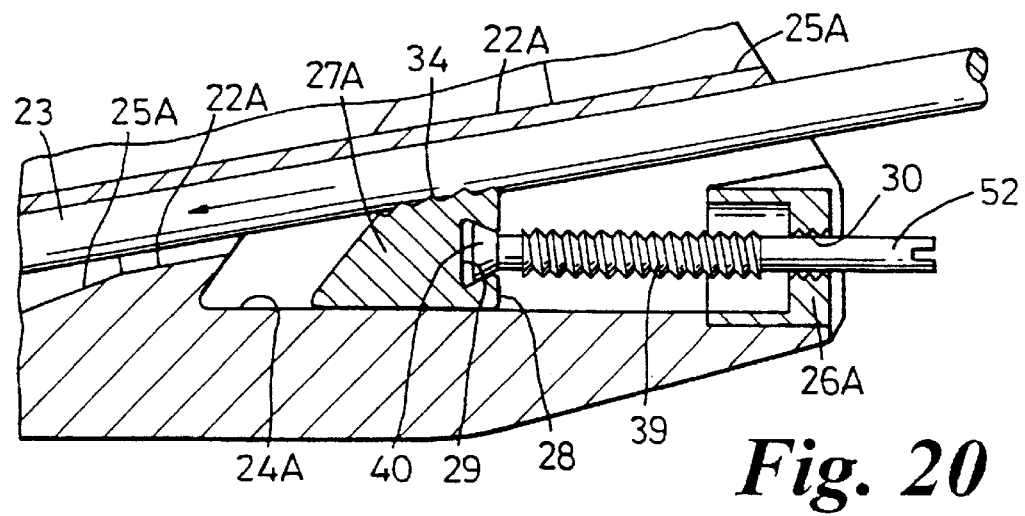
FIG. 20 corresponds to FIG. 19, but shows the wedge and locking screw in a tighter locking position.

Although in FIGS. 14 to 17 the tip 40 of the or each screw 39 is shown having a degree of freedom in the undercut groove 29 in the axial direction of the screw, to permit some tension loading of the inserted wire to draw the respective wedge into a tighter grip, a greater degree of freedom in this regard is afforded by the plain hole 30 in the respective abutment allowing the screw 9 to be pulled by the wedge. Similar greater freedom in this regard is also a feature of the screw arrangement shown in FIGS. 18 to 20, in which the hole 30 for the screw 39 is screwthreaded, and the screwthreaded portion of the screw lies between the necked tip 40 and a plain shank 52 having a diameter no greater than the base diameter of the screwthread, the length L of the screwthreaded portion being limited such that, when the screw 39 has been screwed in far enough for the wedge 27A to have made gripping engagement with an inserted wire (or cable) 23 as shown in FIG. 19, the screwthreaded portion becomes disengaged from the screwthreaded hole 30 in the abutment 26A, whereafter tension loading of the inserted wire (or cable) 23 can draw the wedge 27A into a tighter grip, as shown in FIG. 20, because the screw 39 can be drawn inwards along with the wedge. The plain shank 52 is long enough to protrude from the abutment 26A, so that it can be grasped by pliers or a wrench (not shown) to effect withdrawal of the wedge until the screwthreaded portion can again be engaged with the screwthreaded hole 30 in the abutment.

Figure 21:
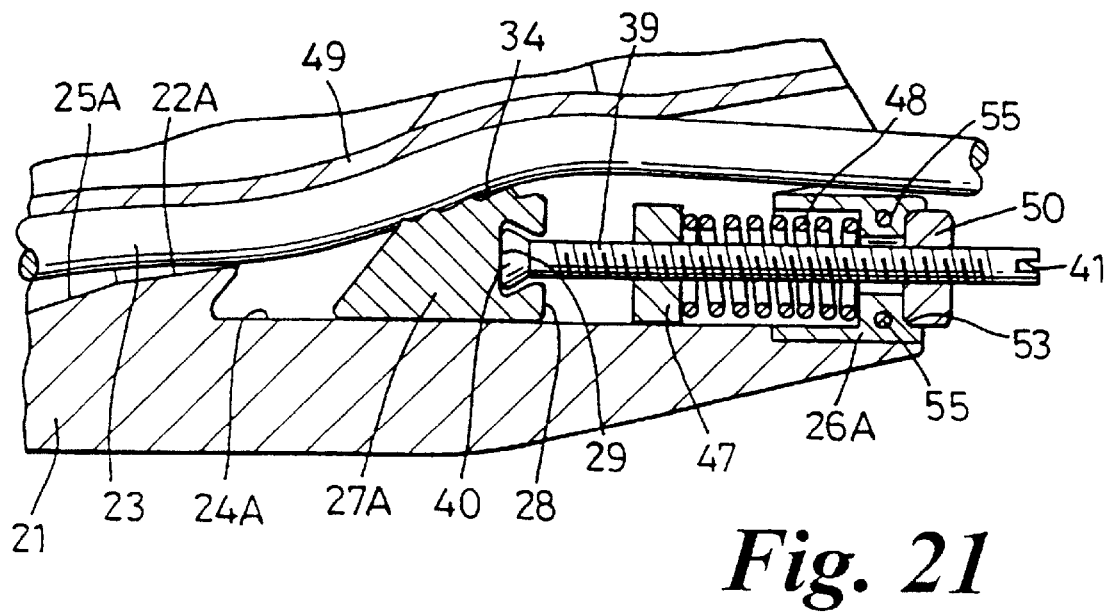
FIG. 21 is also an enlargement of a lower part of FIG. 14, but shows an alternative to the release arrangement of FIG. 17.
Figure 22:
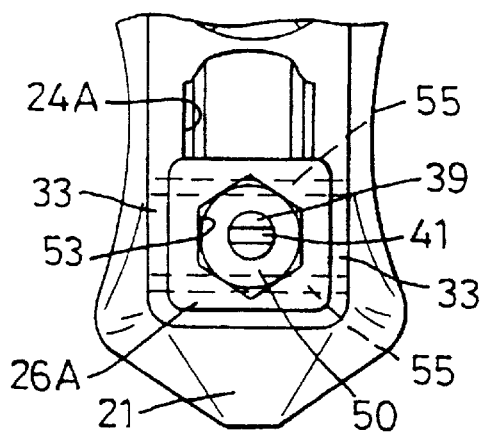
FIG. 22 is a view from the right-hand end of FIG. 21.
Figure 23:
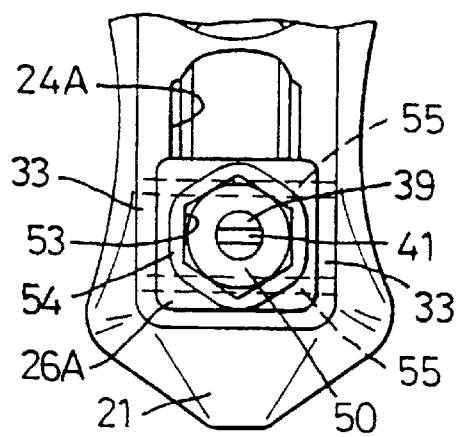
FIG. 23 corresponds to FIG. 22 but shows a minor modification.

In FIG. 21 the additional nut 50 is held stationary by engaging in a matching recess 53, which as shown by FIG. 22 is formed as an indentation in the abutment 26A, while FIG. 23 shows the recess as being formed by an annular upstand 54 on the outer face of the abutment 26A. FIGS. 21 to 23 also show the abutment 26A secured by staking or pins 55 through the side portions 33 of the body 21 of the device.

Figure 24:
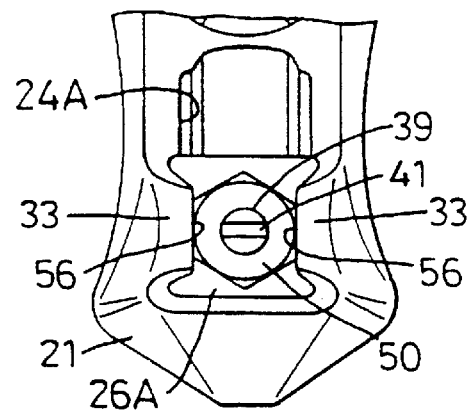
FIG. 24 corresponds to FIG. 22 or FIG. 23 but shows a further alternative.

Alternatively, as shown in FIG. 24, the additional nut 50 can be held stationary in a recess formed at the outer face of the abutment 26A by a pair of projections 56 flanking opposite flats of the additional nut, which projections are constituted by swaged-in side portions 33 of the body 21 of the device overlying the outer face of the abutment.

Figure 25:
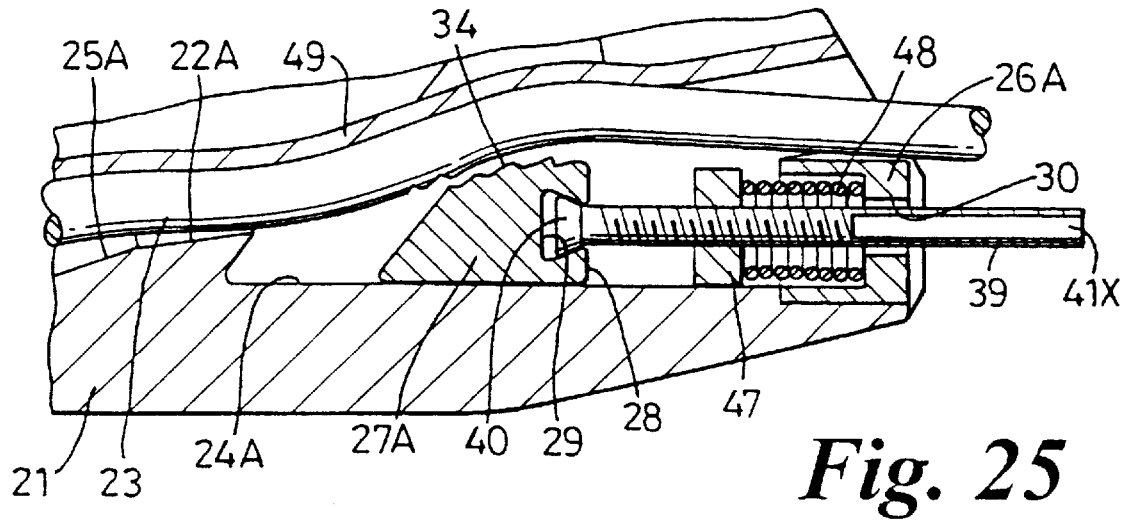
FIG. 25 is another enlargement of a lower part of FIG. 14 but shows a further modification.
Figure 26:
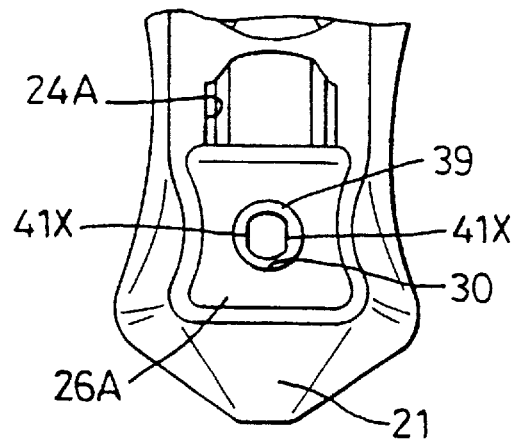
FIG. 26 is a view from the right-hand end of FIG. 25.

In FIGS. 25 and 26, the screw 39 is shown provided with a pair of flats 41X extending longitudinally from the end remote from the necked tip 40, for engagement by a tool (not shown) for effecting rotation of the screw, and which tool may be provided with means for applying the additional nut 50 for use in effecting release of the wedge 27A from the wire 23.

What is claimed is:

1. A wire clamping device comprising a body (21); at least one bore (22) through the body for an end of a wire (23); at least one channel (24) in the body converging at an acute angle and into communication with the bore towards an inlet end (25) of the bore; an abutment (26) at an end of the channel remote from the inlet end of the bore; and a wedge (27) movable along the channel between the abutment and a region of communication with the bore, wherein a face (28) of the wedge (27) facing the abutment (26) is provided with an undercut groove (29), and a hole (30) is provided through the abutment for passage therethrough of a rod-like tool (31) provided with diametrically opposed projections (32) at one end for pulling engagement with the undercut groove (29) by partial rotation of the tool from an insertion position.

2. A wire clamping device as in claim 1, wherein the hole (30) in the abutment (26) has a cross-section conforming closely to a cross-section of the end of the rod-like tool (31) with the projections (32).

3. A wire clamping device as in claim 2, wherein the largest dimension of the hole (30) is aligned with the lengthwise direction of the undercut groove (29) in the wedge (27), wherein upon insertion of the end of the tool (31) into the hole (30) the end of the tool is automatically aligned with the insertion position into the undercut groove.

4. A wire clamping device as in any one of claims 1 to 3, wherein the undercut groove (29) in the wedge (27) has a dovetail cross-section, and the projections (32) on the rod-like tool (31) have a mating angular profile.

5. A wire clamping device as in any one of claims 1 to 3, wherein the undercut groove (29) in the wedge (27) has a T-shaped cross-section and the projections (32) on the rod-like tool (31) have a rectangular profile for mating with a wider part of the groove.

6. A wire clamping device as in claim 1, wherein a coil compression spring (37) is provided between the abutment (26) and the wedge (27).

7. A wire clamping device comprising a body (21); at least one bore (22) through the body for an end of a wire (23); at least one channel (24) in the body converging at an acute angle and into communication with the bore towards an inlet end (25) of the bore; an abutment (26) at an end of the channel remote from the inlet end of the bore; and a wedge (27) movable along the channel between the abutment and a region of communication with the bore, wherein a face (28) of the wedge (27) facing the abutment is provided with an undercut groove (29), and a screwthreaded hole (30) is provided through the abutment (26) for rotation therein of a screw (39) provided with a necked tip (40) at one end rotatably engaged with the undercut groove (29) in the wedge (27), to enable the wedge to be pushed and pulled by rotation of the screw (39) in one direction or another direction, another end of the screw being provided with means (41) for effecting rotation of the screw.

8. A wire clamping devise as in claim 7, wherein the undercut groove (29) in the wedge (27) has a dovetail cross-section, and the necked tip (40) of the screw (39) has a frustoconical form with a smaller diameter end adjoining a remaining portion of the screw.

9. a wire clamping device as in claim 7, wherein the undercut groove (29) in the wedge (27) has a T-shaped cross-section, and the neck tip (40) of the screw then has a head engaging with a wider part of the groove and a neck connecting the head with the remaining portion of the screw and passing through a narrower part of the groove.

10. A wire clamping device as in any one of claims 7 to 9, wherein the necked tip (40) of the screw (39) has some freedom of movement with respect to the groove (29) in the wedge (27) in the axial direction of the screw.

11. A wire clamping device as in any one of claims 7 to 9, wherein the screwthreaded portion of the screw (39) lies between the necked tip (40) and a plain shank (52) having a diameter no greater than the base diameter of the screwthread, the length (L) of the screwthreaded portion being limited such that, when the screw (39) has been screwed in far enough for the wedge (27) to have made gripping engagement with an inserted wire (23) the screwthreaded portion becomes disengaged from the screwthreaded hole (30) in the abutment (26), and the plain shank (52) projects from the abutment (26).

12. A wire clamping device comprising a body (21); at least one bore (22) through the body for an end of a wire (23); at least one channel (24) in the body converging at an acute angle and into communication with the bore towards an inlet end (25) of the bore; an abutment (26) at an end of the channel remote form the inlet end of the bore; and a wedge (27) movable along the channel between the abutment and a region of communication with the bore, wherein a face (28) of the wedge (27) facing the abutment is provided with an undercut groove (29), and the abutment (26) is provided with a plain hole (30), and a screw (39) is provided with a nut (47) non-rotatably slidable along the channel (24), with a coil compression spring (48) between the nut and the abutment; the nut (47) being initially positioned adjacent a necked tip (40) of the screw (39) so that an inserted wire end (44) can push the wedge (27) towards the abutment (26) against the urge of the spring (48), the screw (39) can then be rotated in a first direction to draw the nut (47) towards the abutment (26) so as to compress the spring (48) completely, whereafter further rotation of the screw (39) in the first direction urges the wedge (27) into locking engagement with the wire (23).

13. A wire clamping device as in claim 12, wherein another nut (50) is provided for screwing onto a portion of the screw (39) protruding from the abutment (26) for use in effecting release of the wedge (27) from the wire (23).

14. A wire clamping device as in claim 13, wherein a washer (51) is interposed between the nut (50) and the abutment (26).

15. A wire clamping device as in claim 13, wherein a recess (53) is provided at an outer face of the abutment (26) for engagement by the additional nut (50) to hold the additional nut stationary.

16. A wire clamping device as in claim 15, wherein the recess (53) is formed as an indentation in the abutment (26), with an inner periphery of the indentation matching an outer periphery of the additional nut (50).

17. A wire clamping device as in claim 15, wherein the recess (53) is formed by an annular upstand (54) on the abutment (26), with an inner periphery of the upstand matching an outer periphery of the additional nut (50).

18. A wire clamping device as in claim 15, wherein the recess (53) is formed by a pair of projections (56) flanking opposite flats of the additional nut (50).

19. A wire clamping device as in claim 18, wherein the projections (56) are constituted by swaged-in side portions (33) of the body (21) of the device overlying the outer face of the abutment (26).

20. A wire clamping device as in claim 12 or claim 13, wherein the screw (39) is provided with a pair of flats (41X) extending longitudinally from the end of the screw remote from necked tip (40).

21. A wire clamping device comprising a pair of bores (22A, 22B) disposed in close side-by-side relationship, with respective inlet ends (25A, 25B), at opposite ends of the body (21) and with respective channels (24A, 24B), abutments (26A, 26B) and wedges (27A, 27B), with the channels (24A, 24B) converging in opposite directions with the respective bores (22A, 22B) to regions of communication between the respective channels and bores closely adjacent each other, and with a wall portion (49) therebetween capable of localized distortion under forces exerted by the wedges (27A, 27B) through inserted wires (23) to increase frictional contact of the wires with the respective bores (22A, 22B), wherein at least one of said wedges (27A) has its face (28) facing the respective abutment (26A) provided with an undercut groove (29), the respective abutment (26A) is provided with a hole (30), and a screw (39) which is rotatable in the hole in the abutment, wherein the screw is provided at one end with a necked tip (40) rotatably engaged with the undercut groove (29) in said at least one of said wedges (27A) to enable said at least one of said wedges to be pushed and pulled by rotation of the screw (39) in one direction or another direction another end of the screw (39) being provided with means (41) for effecting said rotation of the screw.

22. A wire clamping device as in claim 21, wherein another one of said wedges has a plain face (42) facing towards the respective abutment (26B), and a coil compression spring (43) is provided between said another one of said wedges (27B) and the respective abutment (26B).

23. A wire clamping device as in claim 21, wherein said another one of said wedges is provided with an undercut groove (29) in its face (28) facing towards the respective abutment (26B), which is provided with a hole (30) for a screw (39) having at one end a necked tip (40) rotatably engaged with the groove (29) in the wedge (27B), another end of the screw (39) being provided with means (41) for effecting rotation of the screw.

24. A wire clamping device as in any one of claims 21 to 23, wherein the hole (30) of said each screw abutment (26A, 26B) is screwthreaded.

25. A wire clamping device as in claim 24, wherein a screwthreaded portion of the screw (39) lies between the necked tip (40) and a plain shank (52) having a diameter no greater than a base diameter of the screwthread, a length (L) of the screwthreaded portion being limited such that, when the screw (39) has been screwed in far enough for the respective wedge (27A, 27B) to have made gripping engagement with an inserted wire (23) the screwthreaded portion becomes disengaged from the screwthreaded hole (30) in the respective abutment (26A, 26B), and the plain shank (52) projects from the abutment (26A, 26B).

26. A wire clamping device as in claim 24, wherein the hole of the respective abutment is a plain hole (30), and the screw (39) is provided with a nut (47) non-rotatably slidable along each said respective channel (24A, 24B), with a coil compression spring (48) between the nut and each staid respective abutment; the nut (47) being initially positioned adjacent the necked tip (40) of each said respective channel so that an inserted wire end (44) can push the wedge (27A, 27B) towards each said respective abutment (26A, 26B) against the urge of the spring (48), the (39) can then be rotated to draw the nut (47) towards each said respective abutment (26A, 26B) so as to compress the spring (48) completely, whereafter further rotation of the screw (39) in the same direction urges each said respective wedge (27A, 27B) into locking engagement with the wire (23).

27. A wire clamping device as in claim 26, wherein another nut (50) is provided for screwing onto the portion of the screw (39) protruding from respective abutment (26A, 26B) for use in effecting release of the respective wedge (27A, 27B) from the wire (23).

28. A wire clamping device as in claim 27, wherein a washer (51) is interposed between the nut (50) and the respective abutment (26A, 26B).

29. A wire clamping device as in claim 27, wherein a recess (53) is provided at the outer face of the respective abutment (26A, 26B) for engagement by the additional nut (50) to hold the respective nut stationary.

30. A wire clamping device as in claim 29, wherein the recess (53) is formed as an indentation in the respective abutment (26A, 26B) with an inner periphery of the indentation matching in outer periphery of the additional nut (50).

31. A wire clamping device as in claim 29, wherein the recess (53) is formed by an annular upstand (54) on the respective (26A, 26B), with an inner periphery of the upstand matching an outer periphery of the additional nut (50).

32. A white clamping device as in claim 27 wherein the screw (39) is provided with a pair of flats (41X) extending longitudinally from an end of the respective screw remote from the necked tip (40).

* * * * *